United States Patent
Chung et al.

(10) Patent No.: US 12,497,669 B2
(45) Date of Patent: Dec. 16, 2025

(54) ULTRA-HIGH-STRENGTH REINFORCING BAR AND MANUFACTURING METHOD THEREOF

(71) Applicant: Hyundai Steel Company, Incheon (KR)

(72) Inventors: Jun Ho Chung, Incheon (KR); Ju Sang Lee, Incheon (KR); Rok Seok Kim, Incheon (KR); Chung Yeob Lee, Incheon (KR)

(73) Assignee: Hyundai Steel Company, Incheon (KR)

( * ) Notice: Subject to any disclaimer, the term of this patent is extended or adjusted under 35 U.S.C. 154(b) by 1014 days.

(21) Appl. No.: 17/609,624

(22) PCT Filed: Oct. 6, 2020

(86) PCT No.: PCT/KR2020/013596
§ 371 (c)(1),
(2) Date: Nov. 8, 2021

(87) PCT Pub. No.: WO2022/034964
PCT Pub. Date: Feb. 17, 2022

(65) Prior Publication Data
US 2022/0364194 A1    Nov. 17, 2022

(30) Foreign Application Priority Data
Aug. 12, 2020   (KR) .................. 10-2020-0101127

(51) Int. Cl.
*C21D 9/00*       (2006.01)
*C21D 6/00*       (2006.01)
(Continued)

(52) U.S. Cl.
CPC .......... *C21D 9/0075* (2013.01); *C21D 6/004* (2013.01); *C21D 6/005* (2013.01); *C21D 6/008* (2013.01);
(Continued)

(58) Field of Classification Search
None
See application file for complete search history.

(56) References Cited

FOREIGN PATENT DOCUMENTS

| JP | H 05-209223 A | 8/1993 |
|----|---------------|--------|
| JP | 2000-144320 A | 5/2000 |

(Continued)

OTHER PUBLICATIONS

Machine translation of KR 20200035524A. (Year: 2020).*
(Continued)

*Primary Examiner* — Xiaowei Su
(74) *Attorney, Agent, or Firm* — Fox Rothschild LLP

(57) ABSTRACT

Provided is an ultra-high-strength reinforcing bar and a method for manufacturing the same are disclosed. In an exemplary embodiment, the ultra-high-strength reinforcing bar includes an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur (S), (Continued)

an amount of 0.005 to 0.02 wt % nitrogen (N), and the remainder being iron (Fe) and other inevitable impurities.

11 Claims, 4 Drawing Sheets

(51) Int. Cl.
| | |
|---|---|
| *C21D 8/06* | (2006.01) |
| *C21D 8/08* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *E04C 5/06* | (2006.01) |

(52) U.S. Cl.
CPC ............ *C21D 8/065* (2013.01); *C21D 8/08* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *E04C 5/06* (2013.01); *C21D 2211/002* (2013.01); *C21D 2211/005* (2013.01); *C21D 2211/008* (2013.01); *C21D 2211/009* (2013.01)

(56) References Cited

FOREIGN PATENT DOCUMENTS

| | | |
|---|---|---|
| JP | 2004-232091 A | 8/2004 |
| JP | 2012-067363 A | 4/2012 |
| JP | 2016-074936 A | 5/2016 |
| JP | 2019-535892 A | 12/2019 |
| KR | 101095486 B1 | 12/2011 |
| KR | 10-2016-0071462 A | 6/2016 |
| KR | 1020200025263 A | 3/2020 |
| KR | 10-2100059 B1 | 4/2020 |
| KR | 1020200035524 A | 4/2020 |

OTHER PUBLICATIONS

Hong, Transactions of Materials Processing. vol. 27, No. 5. (Year: 2018).*

Examination Report issued on Oct. 28, 2022 in corresponding UK Patent Application No. 2116082.5.

Office Action issued on Nov. 22, 2022 in Japanese Patent Application No. 2021-564667.

* cited by examiner

ULTRA-HIGH-STRENGTH REINFORCING BAR AND MANUFACTURING METHOD THEREOF

CROSS-REFERENCE TO RELATED APPLICATIONS

This application is a National Phase application filed under 35 USC 371 of PCT International Application No. PCT/KR2020/013596 with an International Filing Date of Oct. 6, 2020, which claims priority from Korean Application 10-2020-0101127 filed on Aug. 12, 2020. The entire contents of these applications are incorporated herein by reference in their entirety.

TECHNICAL FIELD

The present invention relates to an ultra-high-strength reinforcing bar and a method for manufacturing the same. More particularly, the present invention relates to an ultra-high-strength reinforcing bar for a building structure having excellent seismic performance and a method for manufacturing the same.

BACKGROUND

Recently, structures installed to increase space utilization have become larger. Accordingly, reinforcing bars with greater strength are required. In the past, reinforcing bars having a yield strength of 500 MPa were required, but recently, reinforcing bars having a yield strength of 600 to 700 MPa have been required, and in the future, reinforcing bars having a yield strength of 1.0 GPa or greater are expected to be demanded.

Meanwhile, securing the stability of building structures against natural disasters such as earthquakes, fires, strong winds, heavy snow, ground subsidence and sinkholes, or man-made disasters, which have recently occurred in Korea and foreign countries, is essential for securing public infrastructure safety. To this end, the safety design of the structure is essential, and accordingly, the development of earthquake-resistant steel is urgently needed. In order to impart seismic performance, it is necessary to increase the plastic deformation capacity through the addition of various alloying elements such as carbon (C), manganese (Mn), vanadium (V) and niobium (Nb), but the addition of an excessive amount of ferroalloy has a problem that causes an increase in the production cost.

The background art related to the present invention is disclosed in Korea Patent No. 10-1095486 (published on Dec. 19, 2011; entitled "Method for Manufacturing Seismic Reinforcing Bar and Seismic Reinforcing Bar Manufactured Thereby").

SUMMARY OF THE INVENTION

Technical Problem

An embodiment of the present invention is intended to provide an ultra-high-strength reinforcing bar having high strength and excellent seismic performance and a method for manufacturing the same.

Another embodiment of the present invention is intended to provide an ultra-high-strength reinforcing bar and a method for manufacturing the same, which have excellent productivity and an excellent cost reduction effect as a result of reducing the amounts of alloying elements added and simplifying processes.

Technical Solution

One aspect of the present invention is directed to an ultra-high-strength reinforcing bar. In an exemplary embodiment, the ultra-high-strength reinforcing bar includes an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur (S), an amount of 0.005 to 0.02 wt % nitrogen (N), and the remainder being iron (Fe) and other inevitable impurities, and has a carbon equivalent (Ceq) of 0.7 or greater as calculated according to the following Equation 1. The ultra-high-strength reinforcing bar includes: a central portion; and a surface layer portion formed on the outer circumference of the central portion, wherein the surface layer portion includes tempered martensite, and the central portion is composed of a microstructure including ferrite, pearlite and bainite, wherein the ferrite includes any one or more of polygonal ferrite and acicular ferrite, and the ultra-high-strength reinforcing bar has a yield strength (YS) of 700 MPa or greater, and a tensile strength/yield strength (TS/YS) ratio of 1.25 or greater:

$$Ceq=[C]+[Mn]/6+([Cr]+[V]+[Mo])/5+([Cu]+[Ni])/15 \quad [\text{Equation 1}]$$

wherein [C], [Mn], [Cr], [V], [Mo], [Cu] and [Ni] are the contents (wt %) of carbon (C), manganese (Mn), chromium (Cr), vanadium (V), molybdenum (Mo), copper (Cu) and nickel (Ni), respectively, in the reinforcing bar.

In an exemplary embodiment, the ultra-high-strength reinforcing bar may have a yield strength (YS) of 700 to 850 MPa, a tensile strength/yield strength (TS/YS) ratio of 1.25 to 1.35, and an elongation (El) of 10% or greater.

In an exemplary embodiment, the central portion may be composed of a microstructure including an amount of 30 to 45 vol % of ferrite, an amount of 30 to 45 vol % of pearlite, and an amount of 15 to 25 vol % of bainite.

In an exemplary embodiment, the reinforcing bar may include, on a cross-section basis, 5 to 15 area % of the surface layer portion and 85 to 95 area % of the central portion.

In an exemplary embodiment, the central portion may include a hardened core layer having a hardness of 350 Hv or greater.

In an exemplary embodiment, the hardened core layer may be composed of a microstructure including lower bainite and fine ferrite having an average size of 5 to 10 μm.

In an exemplary embodiment, the hardened core layer may have a hardness of 350 to 400 Hv, the central portion excluding the hardened core layer may have a hardness of 240 to 280 Hv, and the surface layer portion may have a hardness of 330 to 360 Hv.

In an exemplary embodiment, the reinforcing bar may include, on a cross-section basis, 15 to 30 area % of the hardened core layer.

Another aspect of the present invention is directed to a method for manufacturing the ultra-high-strength reinforcing bar. In an exemplary embodiment, the method for manufacturing the ultra-high-strength reinforcing bar includes steps of: reheating a semi-finished product including an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), more than 0 and less than or equal to 0.2 wt % vanadium (V), more than 0 and less than or equal to 0.4 wt % copper (Cu), more than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur (S), an amount of 0.005 to 0.02 wt % nitrogen (N), and the remainder being iron (Fe) and other inevitable impurities, the semi-finished product having a carbon equivalent (Ceq) of 0.7 or greater as calculated according to the following Equation 1; manufacturing a rolled material by hot-rolling the reheated semi-finished product at a finish delivery temperature of 850 to 1,000° C.; and cooling the rolled material to the Ms temperature or below, the cooling including a step of subjecting the rolled material to heat recuperation to reach a temperature of 500 to 700° C., wherein the ultra-high-strength reinforcing bar includes: a central portion; and a surface layer portion formed on the outer circumference of the central portion, wherein the surface layer portion includes tempered martensite, and the central portion is composed of a microstructure including ferrite, pearlite and bainite, wherein the ferrite includes any one or more of polygonal ferrite and acicular ferrite, and the ultra-high-strength reinforcing bar has a yield strength (YS) of 700 MPa or greater, and a tensile strength/yield strength (TS/YS) ratio of 1.25 or greater:

$$Ceq=[C]+[Mn]/6+([Cr]+[V]+[Mo])/5+([Cu]+[Ni])/15 \quad \text{[Equation 1]}$$

wherein [C], [Mn], [Cr], [V], [Mo], [Cu] and [Ni] are the contents (wt %) of carbon (C), manganese (Mn), chromium (Cr), vanadium (V), molybdenum (Mo), copper (Cu) and nickel (Ni), respectively, in the semi-finished product.

In an exemplary embodiment, the cooling may be performed under conditions of a rolled material line speed of 6.7 to 7.2 m/s and a specific water amount of 3.7 to 3.91/kg.

In an exemplary embodiment, the reheating may be performed at a temperature of 1,050 to 1,250° C.

In an exemplary embodiment, the central portion may include a hardened core layer having a hardness of 350 Hv or greater.

Advantageous Effects

The ultra-high-strength reinforcing bar of the present invention has high strength and excellent seismic performance properties, and has excellent productivity and an excellent cost reduction effect as a result of reducing the amounts of alloying elements added and simplifying processes. When the ultra-high-strength reinforcing bar of the present invention is applied to a building structure, it may delay the time of collapse compared to a conventional reinforcing bar in the event of an earthquake, and may have excellent effects of shortening the construction period and reducing the construction cost.

DETAILED DESCRIPTION

Figure 1:
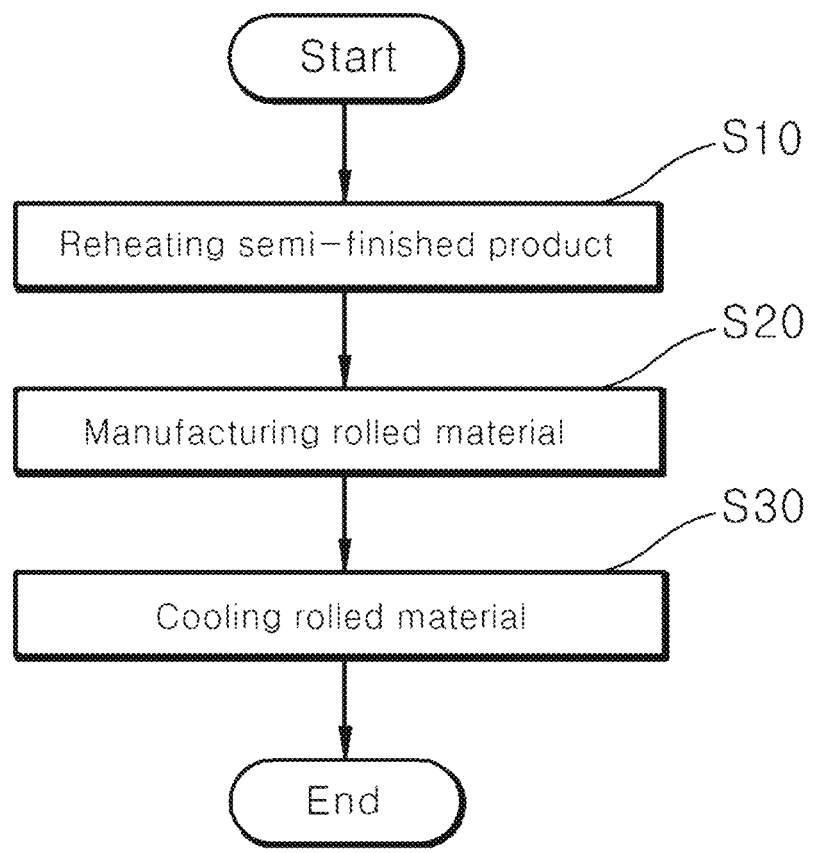
FIG. 1 shows a method for manufacturing an ultra-high-strength reinforcing bar according to an exemplary embodiment of the present invention.

Hereinafter, the present invention will be described in detail. In the following description, the detailed description of related publicly-known technology or configuration will be omitted when it may unnecessarily obscure the subject matter of the present invention.

In addition, the terms used in the following description are terms defined taking into consideration the functions thereof in the present invention, and may be changed in accordance with the option of a user or operator or a usual practice. Accordingly, the definition of the terms should be made based on the contents throughout the present specification.

Ultra-High-Strength Reinforcing Bar

One aspect of the present invention is directed to an ultra-high-strength reinforcing bar. In an exemplary embodiment, the ultra-high-strength reinforcing bar includes an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur (S), an amount of 0.005 to 0.02 wt % nitrogen (N), and the remainder being iron (Fe) and other inevitable impurities.

Hereinafter, the constituent components of the ultra-high-strength reinforcing bar will be described in detail.

Carbon (C)

The carbon (C) is an element that is most effective for increasing the strength of steel, and particularly, is important for increasing the tensile strength of steel. The carbon is dissolved in austenite and forms a martensitic structure during tempering. As the content of carbon increases, the tempering hardness increases, but the possibility of deformation during tempering becomes greater. Carbon combines with elements such as iron (Fe), chromium (Cr), vanadium (V) and titanium (Ti) to form carbides, thus improving strength and hardness.

In an exemplary embodiment, the carbon is included in an amount of 0.10 to 0.45 wt % based on the total weight of the ultra-high-strength reinforcing bar. If the carbon is included in an amount less than 0.10 wt %, it may be difficult to secure strength and hardness, and if the carbon is included in an amount greater than 0.45 wt %, the possibility of deformation during tempering may increase, and it may be difficult to secure elongation and low-temperature toughness. Preferably, the carbon may be included in an amount of 0.35 to 0.40 wt %.

Silicon (Si)

The silicon (Si) is an element that increases hardenability, such as molybdenum and chromium, and is used as a deoxidizer. The silicon is a strong deoxidizer, and when it is added in an amount of 2 wt % or greater, it lowers toughness and impairs plastic workability, and thus the amount of silicon added is limited. In addition, the silicon has an effect of increasing softening resistance during tempering. In addition, the silicon is a hardenability element that may form a hardening phase in a certain controlled cooling temperature range.

In an exemplary embodiment, the silicon is included in an amount of 0.5 to 1.0 wt % based on the total weight of the ultra-high-strength reinforcing bar. When the silicon is included in the above amount, it may prevent grain boundary movement and grain coarsening due to a change from the austenite ($\gamma$) to ferrite ($\alpha$) phase transformation temperature and a change in the solubility of carbon in ferrite, and may form VCN precipitates in ferrite by inducing defects of residual vanadium (V) and carbon and nitrogen (C, N) in a temperature range in which composite ferrite (polygonal and acicular) and bainite are formed, whereby the steel may have excellent material properties and mechanical properties. If the silicon is included in an amount less than 0.5 wt %, the effect of addition thereof may be insignificant, and if the silicon is included in an amount greater than 1.0 wt %, it may form an oxide on the surface of the steel, thereby reducing the ductility and workability of the steel. Preferably, the silicon may be included in an amount of 0.50 to 0.65 wt %.

Manganese (Mn)

The manganese (Mn) is an austenite stabilizing element in steel and is effective in improving hardenability. A portion of manganese is dissolved in steel, and a portion thereof combines with sulfur contained in steel to form MnS which is a non-metallic inclusion. The MnS is ductile and thus elongated in the machine direction during plastic working. However, due to the formation of MnS, the grains become weak while the sulfur component in the steel decreases, and the formation of FeS, which is a low-melting-point compound, may be suppressed.

In an exemplary embodiment, the manganese is included in an amount of 0.40 to 1.80 wt % based on the total weight of the ultra-high-strength reinforcing bar. If the manganese is included in an amount less than 0.40 wt %, the effect of addition thereof may be insignificant, and if the manganese is included in an amount greater than 1.80 wt %, the contents of non-metallic inclusions such as MnS may increase, and thus defects such as cracks may occur during welding. Preferably, the manganese may be included in an amount of 1.2 to 1.5 wt %.

Chromium (Cr)

The chromium (Cr) is a ferrite stabilizing element, and when it is added to the carbon- and manganese-containing steel of the present invention, it may delay the diffusion of carbon due to a solute-interfering effect, thereby affecting particle size refinement and improving hardenability.

In an exemplary embodiment, the chromium is included in an amount of 0.10 to 1.0 wt % based on the total weight of the ultra-high-strength reinforcing bar. If the chromium is included in an amount less than 0.10 wt %, the effect of addition thereof may be insignificant, and if the chromium is included in an amount greater than 1.0 wt %, the weldability of the steel or the toughness of the heat-affected zone thereof may be reduced. Preferably, the chromium may be included in an amount of 0.2 to 0.5 wt %.

Vanadium (V)

The vanadium (V) has a stronger carbide-forming ability than chromium and refines crystal grains, and thus it is also used to improve stainless steel or cutting tool steel. In addition, since the vanadium exhibits a remarkable precipitation hardening effect by forming compounds with other metal elements, it is also used for precipitation hardening steels and permanent magnets.

In an exemplary embodiment, the vanadium is included in an amount greater than 0 and less than or equal to 0.2 wt % based on the total weight of the ultra-high-strength reinforcing bar. If the vanadium is included in an amount greater than 0.2 wt %, the production cost may increase, thereby reducing economic efficiency, and the low-temperature impact toughness of the steel may be reduced. Preferably, the vanadium may be included in an amount of 0.08 to 0.15 wt %.

Copper (Cu)

The copper (Cu) is dissolved in an amount of up to about 0.35 wt % in ferrite at room temperature and exhibits a solid solution strengthening effect, and thus it may slightly improve strength and hardness, but may reduce elongation.

Steel containing copper has a problem in terms of hot workability, and in particular, when copper is included in an amount of 0.5 wt % or greater, it causes red shortness. In addition, even if copper is included in a small amount, it significantly increases corrosion resistance in the air or seawater, and when copper is added in an amount of 0.4 wt % or greater, a precipitation hardening effect occurs due to fine precipitation of copper. Thus, in actual stainless steel, about 4 wt % of copper is added and precipitated to make strong stainless steel.

In an exemplary embodiment, the copper is included in an amount greater than 0 and less than or equal to 0.4 wt % based on the total weight of the ultra-high-strength reinforcing bar. If the copper is included in an amount greater than 0.4 wt %, it may reduce hot workability and elongation or cause red shortness. Preferably, the copper may be included in an amount of 0.1 to 0.3 wt %.

Molybdenum (Mo)

The molybdenum (Mo) is used as an element for increasing hardenability, and may improve the strength, toughness, and hardenability of steel in the present invention.

In an exemplary embodiment, the molybdenum is included in an amount greater than 0 and less than or equal to 0.5 wt % based on the total weight of the ultra-high-strength reinforcing bar. If the molybdenum is included in an amount greater than 0.5 wt %, it may degrade weldability. Preferably, the molybdenum may be included in an amount of 0.001 to 0.1 wt %.

Aluminum (Al)

The aluminum (Al) may function as a deoxidizer. In an exemplary embodiment, the aluminum is included in an amount of 0.015 to 0.070 wt % based on the total weight of the ultra-high-strength reinforcing bar. If the aluminum is included in an amount of less than 0.015 wt %, the effect of addition thereof may be insignificant, and if the aluminum is included in an amount greater than 0.070 wt %, it may increase the production of non-metallic inclusions such as aluminum oxide ($Al_2O_3$). Preferably, the aluminum may be included in an amount of 0.015 to 0.025 wt %.

Nickel (Ni)

The nickel (Ni) may increase the strength of steel and allows steel to ensure a low-temperature impact value. In an exemplary embodiment, the nickel is included in an amount greater than 0 and less than or equal to 0.25 wt % based on the total weight of the ultra-high-strength reinforcing bar. If the nickel is included in an amount greater than 0.25 wt %, it may excessively increase the strength of the steel at room temperature, thereby degrading the weldability and toughness of the steel. Preferably, the nickel may be included in an amount of 0.0001 to 0.005 wt %.

Tin (Sn)

The tin (Sn) may be added to secure corrosion resistance. In an exemplary embodiment, the tin is included in an amount greater than 0 and less than or equal to 0.1 wt % based on the total weight of the ultra-high-strength reinforcing bar. If the tin is included in an amount greater than 0.1 wt %, it may significantly reduce elongation. Preferably, the tin may be included in an amount of 0.0001 to 0.005 wt %.

Phosphorus (P)

The phosphorus (P) does not become a problem if it is uniformly distributed in steel, but usually forms $Fe_3P$. The $Fe_3P$ is extremely fragile and segregated, and thus it is not homogenized even by annealing, and is elongated during processing such as forging and rolling. The phosphorus lowers impact resistance, promotes temper brittleness and improves machinability in free-cutting steel, but is generally regarded as an element harmful to steel.

In an exemplary embodiment, the phosphorus is included in an amount greater than 0 and less than or equal to 0.05 wt % based on the total weight of the ultra-high-strength reinforcing bar. If the phosphorus is included in an amount greater than 0.05 wt %, it may adversely affect material properties by forming centerline segregation and fine segregation, and may degrade ductility. Preferably, the phosphorus may be included in an amount greater than 0 and less than or equal to 0.03 wt %.

Sulfur (S)

The sulfur (S) combines with manganese (Mn), zinc (Zn), titanium (Ti) and molybdenum (Mo), thereby improving the machinability of steel, and combines with manganese to form MnS inclusions. If the content of manganese in steel is not sufficient, the manganese combines with iron to form FeS. Because this FeS is very brittle and has a low melting point, it cracks during hot and cold working. Therefore, in order to avoid the formation of such FeS inclusions, manganese and sulfur may be included at a ratio of about 5:1.

In an exemplary embodiment, the sulfur is included in an amount greater than 0 and less than or equal to 0.03 wt % based on the total weight of the ultra-high-strength reinforcing bar. If the sulfur is included in an amount greater than 0.03 wt %, it may greatly reduce ductility, and may significantly increase the formation of non-metallic inclusions such as MnS. Preferably, the sulfur may be included in an amount greater than 0 and less than or equal to 0.025 wt %.

Nitrogen (N)

The nitrogen (N) has a great effect on the mechanical properties of steel even when it is present in very small amounts, and it increases the tensile strength and yield strength of the steel, but reduces the elongation of the steel. In particular, the nitrogen reduces the impact value of the steel and significantly increases the transition temperature of the steel. The nitrogen is an interstitial element, has a fast diffusion rate, and shows a continuous solubility change from 0.1 wt % to 0.003 wt % with respect to ferrite. In addition, the nitrogen forms nitrides with titanium, zirconium, vanadium and niobium, thus refining grains.

In an exemplary embodiment, the nitrogen is included in an amount of 0.005 to 0.02 wt % based on the total weight of the ultra-high-strength reinforcing bar. If the nitrogen is included in an amount of less than 0.005 wt %, the effect of addition thereof may be insignificant, and if the nitrogen is included in an amount of more than 0.02 wt %, it may reduce the elongation and formability of the steel. Preferably, the nitrogen may be included in an amount of more than 0 and less than or equal to 0.01 wt %.

In an exemplary embodiment, the ultra-high-strength reinforcing bar has a carbon equivalent (Ceq) of 0.7 or more as calculated according to the following Equation 1:

$$Ceq=[C]+[Mn]/6+([Cr]+[V]+[Mo])/5+([Cu]+[Ni])/15 \quad \text{[Equation 1]}$$

wherein [C], [Mn], [Cr], [V], [Mo], [Cu] and [Ni] are the contents (wt %) of carbon (C), manganese (Mn), chromium (Cr), vanadium (V), molybdenum (Mo), copper (Cu) and nickel (Ni), respectively, in the reinforcing bar.

When the carbon equivalent is 0.7 or more, it is possible to achieve the seismic performance and yield strength required for the reinforcing bar of the present invention. If the carbon equivalent is less than 0.7, the seismic performance and strength of the reinforcing bar of the present invention may be reduced. For example, the carbon equivalent may be 0.7 to 0.8.

Figure 2:
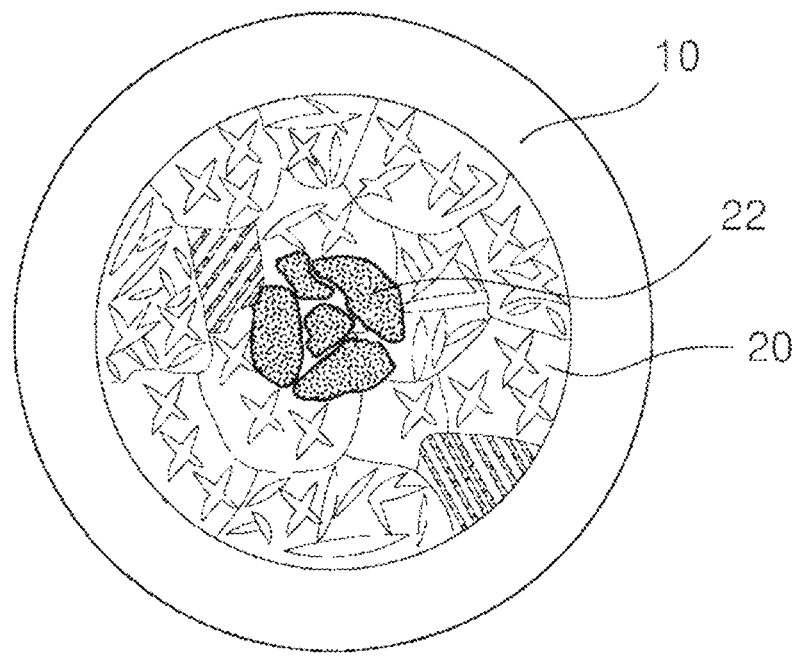
FIG. 2 is a cross-sectional view of an ultra-high-strength reinforcing bar according to an exemplary embodiment of the present invention.

FIG. 2 is a cross-sectional view of an ultra-high-strength reinforcing bar according to an exemplary embodiment of the present invention.

Referring to FIG. 2, the ultra-high-strength reinforcing bar includes: a central portion 20; and a surface layer portion 10 formed on the outer circumference of the central portion 20.

The surface layer portion includes tempered martensite.

The central portion is composed of a microstructure including ferrite, pearlite and bainite. For example, the central portion may be composed of a microstructure including an amount of 30 to 45 vol % of ferrite, an amount of 30 to 45 vol % of pearlite, and an amount of 15 to 25 vol % of bainite. When the central portion is formed under the volume fraction conditions of the microstructure, the reinforcing bar may have both excellent strength and seismic performance.

The ferrite includes at least one of polygonal ferrite and acicular ferrite.

In an exemplary embodiment, the ultra-high-strength reinforcing bar may include, on a cross-section basis, 5 to 15 area % of the surface layer portion and 85 to 95 area % of the central portion. Under the above conditions, the reinforcing bar may have excellent strength and seismic performance. For example, the reinforcing bar may include 5 to 10 area % of the surface layer portion and 90 to 95 area % of the central portion.

Referring to FIG. 2, the central portion 20 may include a hardened core layer 22. The hardened core layer is formed through stress-induced transformation, and may have both excellent seismic performance and strength.

The hardened core layer may be composed of a microstructure including lower bainite and fine ferrite having an average size of 5 to 10 µm. When the hardened core layer is composed of the microstructure, the reinforcing bar may have both excellent seismic performance and strength. For example, the fine ferrite may have an average size of 6 to 8 µm.

The hardened core layer may have a hardness of 350 Hv or greater. Under the above conditions, the ultra-high-strength reinforcing bar of the present invention may have both excellent seismic performance and strength.

For example, the hardened core layer may have a hardness of 350 to 400 Hv, the central portion excluding the hardened core layer may have a hardness of 240 to 280 Hv, and the surface layer portion may have a hardness of 330 to 360 Hv.

In an exemplary embodiment, the ultra-high-strength reinforcing bar may include, on a cross-section basis, 15 to 30 area % of the hardened core layer. When the hardened core layer is formed under the above conditions, the reinforcing bar may have excellent seismic performance and strength. For example, the ultra-high-strength reinforcing bar may include 15 to 25 area % of the hardened core layer.

In an exemplary embodiment, the ultra-high-strength reinforcing bar has a yield strength (YS) of 700 MPa or greater, a tensile strength/yield strength (TS/YS) ratio of 1.25 or greater, and an elongation (El) of 10% or greater. Under the above conditions, the ultra-high-strength reinforcing bar may have both excellent strength and seismic performance. For example, the ultra-high-strength reinforcing bar may have a yield strength (YS) of 700 to 850 MPa, a tensile strength/yield strength (TS/YS) ratio of 1.25 to 1.35, and an elongation (El) of 10 to 20%.

Method for Manufacturing Ultra-High-Strength Reinforcing Bar

Another aspect of the present invention is directed to a method for manufacturing an ultra-high-strength reinforcing bar. FIG. 1 shows a method for manufacturing an ultra-high-strength reinforcing bar according to an exemplary embodiment of the present invention. Referring to FIG. 1, the method for manufacturing an ultra-high-strength reinforcing bar includes steps of: (S10) reheating a semi-finished product; (S20) manufacturing a rolled material; and (S30) cooling.

More specifically, the method for manufacturing an ultra-high-strength reinforcing bar includes steps of: (S10) reheating a semi-finished product including an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur (S), an amount of 0.005 to 0.02 wt % nitrogen (N), and the remainder being iron (Fe) and other inevitable impurities, the semi-finished product having a carbon equivalent (Ceq) of 0.7 or greater; (S20) manufacturing a rolled material by hot-rolling the reheated semi-finished product at a finish delivery temperature of 850 to 1,000° C.; and (S30) cooling the rolled material to a temperature lower than or equal to the Ms temperature, the cooling including a step of subjecting the rolled material to heat recuperation to reach a temperature of 500 to 700° C.

The manufactured ultra-high-strength reinforcing bar includes: a central portion; and a surface layer portion formed on the outer circumference of the central portion, wherein the surface layer portion includes tempered martensite, and the central portion is composed of a microstructure including ferrite, pearlite and bainite, wherein the ferrite includes any one or more of polygonal ferrite and acicular ferrite. The ultra-high-strength reinforcing bar has a yield strength (YS) of 700 MPa or greater, and a tensile strength/yield strength (TS/YS) ratio of 1.25 or greater Hereinafter, each step of the method for manufacturing an ultra-high-strength reinforcing bar will be described in detail.

(S10) Step of Reheating Semi-Finished Product

This step is a step of reheating a semi-finished product including an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur (S), an amount of 0.005 to 0.02 wt % nitrogen (N), and the remainder being iron (Fe) and other inevitable impurities.

In an exemplary embodiment, the semi-finished product may be a bloom or billet manufactured by continuously casting molten steel including the above-described alloying components.

Since the components included in the semi-finished product are the same as those described above, detailed description thereof will be omitted.

In an exemplary embodiment, the semi-finished product has a carbon equivalent (Ceq) of 0.7 or more as calculated according to the following Formula 1:

$$Ceq=[C]+[Mn]/6+([Cr]+[V]+[Mo])/5+([Cu]+[Ni])/15 \quad \text{[Equation 1]}$$

wherein [C], [Mn], [Cr], [V], [Mo], [Cu] and [Ni] are the contents (wt %) of carbon (C), manganese (Mn), chromium (Cr), vanadium (V), molybdenum (Mo), copper (Cu) and nickel (Ni), respectively, in the semi-finished product.

When the carbon equivalent is 0.7 or greater, it is possible to achieve the seismic performance and yield strength required for the reinforcing bar of the present invention. If the carbon equivalent is less than 0.7, the seismic performance and strength of the reinforcing bar of the present invention may be reduced. For example, the carbon equivalent may be 0.7 to 0.8. For example, it may be 0.70, 0.71, 0.72, 0.73, 0.74, 0.75, 0.76, 0.77, 0.78, 0.79 or 0.80.

In an exemplary embodiment, the reheating may be performed at a temperature of 1,050 to 1,250° C. When the reheating is performed under the above condition, segregation components and precipitates may be sufficiently re-dissolved, and the rolling load may be minimized. For example, the reheating may be performed at a temperature of 1,050 to 1,150° C.

(S20) Step of Manufacturing Rolled Material

This step is a step of manufacturing a rolled material by hot-rolling the reheated semi-finished product at a finish delivery temperature of 850 to 1,000° C.

For example, the rolled material may be manufactured by starting hot-rolling of the reheated semi-finished product at a temperature of 1,050 to 1,150° C., and terminating the hot rolling at a finish delivery temperature of 850 to 1,000° C. In an exemplary embodiment, the hot rolling may be performed through a roughing mill (RM), an intermediate mill (IM), and a finishing mill (FM).

If the hot rolling is performed at a finish delivery temperature lower than 850° C., a rolling load may be caused, thus reducing productivity and the heat treatment effect, and if the hot rolling is performed at a finish delivery temperature higher than 1,000° C., a coarse pearlite structure may be formed, thus reducing the strength of the steel. For example, the hot rolling may be performed at a finish delivery temperature of 940 to 1,000° C.

(S30) Cooling Step

This step is a step of cooling the rolled material to the Ms temperature or below through a tempcore process. For example, the surface of the rolled material may be cooled to the martensitic transformation starting temperature (Ms temperature) or below through a tempcore process.

If cooling of the surface of the rolled material is terminated at a temperature higher than the Ms temperature, it may be difficult to form the complex microstructure of the reinforcing bar targeted by the present invention, and thus it may be difficult to secure the strength targeted by the present invention.

In an exemplary embodiment, the tempcore process includes a step of subjecting the cooled rolled material to heat recuperation to reach a temperature of 500 to 700° C. If the heat recuperation temperature is not ensured, the target thickness of the hardened layer in the surface layer portion cannot be ensured. For example, the cooled rolled material may be subjected to heat recuperation to reach a temperature of 630 to 680° C. The rolled material may be air-cooled after the heat recuperation.

In the cooling, the surface of the rolled material may be cooled to the Ms temperature or below through the tempcore process to form a surface layer portion, and a central portion of the rolled material excluding the surface layer portion may undergo stress-induced transformation through controlled cooling. During the cooling, a composite microstructure including 30 to 45 vol % of at least one of polygonal ferrite and acicular ferrite, 30 to 45 vol % of pearlite, and 15 to 25 vol % of bainite may be formed in the central portion, and a hardened core layer composed of lower bainite (stress-induced bainite) and fine ferrite may be formed in the central portion.

In an exemplary embodiment, the tempcore process may be performed under conditions of a rolled material line speed of 6.7 to 7.2 m/s and a specific water amount of 3.7 to 3.9 l/kg (or 3.7 to 3.9 l/rolled material-kg). When the specific water amount and the line speed are controlled to the above conditions, it is possible to achieve the heat recuperation temperature targeted by the present invention, and to induce the formation of a hardened core layer composed of a microstructure including bainite and fine ferrite in the central portion of the ultra-high-strength reinforcing bar through stress-induced transformation while controlling the formation of the surface layer portion of the ultra-high-strength reinforcing bar. Under the above-described rolled material line speed and specific water amount conditions, cooling may be sufficiently performed, thus achieving the heat recuperation temperature range targeted by the present invention.

In an exemplary embodiment, the ultra-high-strength reinforcing bar may include, on a cross-section basis, 5 to 15 area % of the surface layer portion and 85 to 95 area % of the central portion. Under the above conditions, the strength and seismic performance of the reinforcing bar may be excellent. For example, the reinforcing bar may include 5 to 10 area % of the surface layer portion and 90 to 95 area % of the central portion.

In an exemplary embodiment, the central portion may include a hardened core layer. The hardened core layer may be formed through stress-induced transformation, and may have both excellent seismic performance and strength.

The hardened core layer may be composed of a microstructure including lower bainite and fine ferrite having an average size of 5 to 10 μm. In the present specification, the "size" may mean the maximum length of the fine ferrite. When the hardened core layer is composed of the microstructure, it may have both excellent seismic performance and strength. For example, the fine ferrite may have an average size of 6 to 8 μm.

The hardened core layer may have a hardness of 350 Hv or greater. Under the above condition, the ultra-high-strength reinforcing bar of the present invention may have both excellent seismic performance and strength.

For example, the hardened core layer may have a hardness of 350 to 400 Hv, the central portion excluding the hardened core layer may have a hardness of 240 to 280 Hv, and the surface layer portion may have a hardness of 330 to 360 Hv.

In an exemplary embodiment, the ultra-high-strength reinforcing bar may include, on a cross-section basis, 15 to 30 area % of the hardened core layer. When the hardened core layer is formed under the above conditions, it may have both excellent seismic performance and strength. For example, the ultra-high-strength reinforcing bar may include 15 to 25 area % of the hardened core layer.

In an exemplary embodiment, the ultra-high-strength reinforcing bar may have a yield strength (YS) of 700 MPa or greater, a tensile strength/yield strength (TS/YS) ratio of 1.25 or greater, and an elongation (El) of 10% or greater. Under the above conditions, the ultra-high-strength reinforcing bar may have both excellent strength and seismic performance. For example, the ultra-high-strength reinforcing bar may have a yield strength (YS) of 700 to 850 MPa, a tensile strength/yield strength (TS/YS) ratio of 1.25 to 1.35, and an elongation (El) of 10 to 20%.

EXAMPLE

Hereinafter, the configuration and operation of the present invention will be described in more detail with reference to preferred examples of the present invention. However, these examples describe preferred embodiments of the present invention and cannot be construed as limiting the scope of the present invention in any way.

Example and Comparative Examples 1 to 8

According to the components and contents shown in Table 1 below, semi-finished products were prepared, which each include alloying components and the remainder being iron (Fe) and other inevitable impurities. In addition, the carbon equivalent of each of the semi-finished products was calculated according to the following Equation 1 below, and the results are also shown in Table 1 below.

$$Ceq=[C]+[Mn]/6+([Cr]+[V]+[Mo])/5+([Cu]+[Ni])/15 \quad \text{[Equation 1]}$$

wherein [C], [Mn], [Cr], [V], [Mo], [Cu] and [Ni] are the contents (wt %) of carbon (C), manganese (Mn), chromium (Cr), vanadium (V), molybdenum (Mo), copper (Cu) and nickel (Ni), respectively, in the semi-finished product.

Thereafter, the semi-finished product including the components of each of the Example and the Comparative Examples was reheated under the conditions shown in Table 2 below, and then hot-rolled, thus manufacturing rolled materials. Then, each of the rolled materials was cooled to the Ms temperature or below through tempcore cooling under the conditions of line speed and specific water amount shown in Table 2 below. In addition, the heat recuperation temperatures of the rolled materials during tempcore cooling are also shown in Table 2 below.

TABLE 1

|  | C | Si | Mn | P | S | Cu | V | Cr | Mo | Ni | Sn | Al | N | Ceq |
|---|---|---|---|---|---|---|---|---|---|---|---|---|---|---|
| Example | 0.37 | 0.5 | 1.43 | 0.018 | 0.028 | 0.31 | 0.115 | 0.31 | 0.03 | 0.10 | 0.003 | 0.016 | 0.009 | 0.73 |
| Comp. Ex, 1 | 0.34 | 0.25 | 1.41 | 0.025 | 0.02 | 0.25 | 0.118 | 0.16 | 0.02 | 0.10 | 0.003 | 0.015 | 0.01 | 0.66 |
| Comp. Ex, 2 | 0.29 | 0.22 | 1.38 | 0.028 | 0.02 | 0.16 | 0.16 | 0.14 | 0.02 | 0.10 | 0.003 | 0.016 | 0.009 | 0.60 |
| Comp. Ex, 3 | 0.31 | 0.51 | 1.5 | 0.02 | 0.02 | 0.22 | 0.10 | 0.15 | 0.06 | 0.10 | 0.003 | 0.015 | 0.01 | 0.64 |
| Comp. Ex, 4 | 0.34 | 0.2 | 1.42 | 0.02 | 0.02 | 0.20 | 0.16 | 0.20 | 0.02 | 0.10 | 0.003 | 0.015 | 0.01 | 0.67 |
| Comp. Ex, 5 | 0.37 | 0.5 | 1.43 | 0.018 | 0.028 | 0.31 | 0.115 | 0.31 | 0.03 | 0.10 | 0.003 | 0.016 | 0.009 | 0.73 |
| Comp. Ex, 6 | 0.37 | 0.5 | 1.43 | 0.018 | 0.028 | 0.31 | 0.115 | 0.31 | 0.03 | 0.10 | 0.003 | 0.016 | 0.009 | 0.73 |
| Comp. Ex, 7 | 0.37 | 0.5 | 1.43 | 0.018 | 0.028 | 0.31 | 0.115 | 0.31 | 0.03 | 0.10 | 0.003 | 0.016 | 0.009 | 0.73 |
| Comp. Ex, 8 | 0.37 | 0.5 | 1.43 | 0.018 | 0.028 | 0.31 | 0.115 | 0.31 | 0.03 | 0.10 | 0.003 | 0.016 | 0.009 | 0.73 |

TABLE 2

| | Rolling-cooling conditions | | | | | |
|---|---|---|---|---|---|---|
| | Reheating (° C.) | Rolling start (° C.) | Finish rolling (° C.) | Line speed (m/s) | Specific water amount (l/kg) | Heat recuperation temperature (° C.) |
| Example | 1,100 | 1,080 | 950 | 7.0 | 3.8 | 650 |
| Comparative Example 1 | | | 960 | 6.8 | 4.2 | 650 |
| Comparative Example 2 | | | 960 | 7.5 | 4.0 | 640 |
| Comparative Example 3 | | | 950 | 6.8 | 3.5 | 645 |
| Comparative Example 4 | | | 950 | 7.5 | 4.0 | 645 |
| Comparative Example 5 | | | 950 | 6.0 | 3.8 | 630 |
| Comparative Example 6 | | | 950 | 8.0 | 3.8 | 680 |
| Comparative Example 7 | | | 950 | 7.0 | 3.0 | 670 |
| Comparative Example 8 | | | 950 | 7.0 | 5.0 | 630 |

For each of the reinforcing bars manufactured in the Example and Comparative Examples 1 to 8, the yield strength (YS), the yield ratio (YS/TS), the elongation (%), the cross-sectional area of the microstructure of the central portion of each reinforcing bar, and the cross-sectional area of the surface layer portion relative to the cross-section of each reinforcing bar were measured and the results of the measurement are shown in Table 3 below.

TABLE 3

| | Mechanical properties | | | Microstructure | | | Surface layer portion (area %) |
|---|---|---|---|---|---|---|---|
| | | Yield ratio | | Central portion (volume %) | | | |
| | YS (MPa) | (YS/TS) | EI (%) | Ferrite | Pearlite | Bainite | |
| Example | 738 | 0.787 | 13.6 | 42 (polygonal + acicular) | 34 | 24 | 8 |
| Comparative Example 1 | 759 | 0.826 | 11.5 | 35 (polygonal) | 65 | — | 10 |
| Comparative Example 2 | 670 | 0.840 | 13.1 | 37 (polygonal) | 63 | — | 13 |

TABLE 3-continued

| | Mechanical properties | | | Microstructure | | | Surface layer portion (area %) |
|---|---|---|---|---|---|---|---|
| | YS (MPa) | Yield ratio (YS/TS) | EI (%) | Central portion (volume %) | | | |
| | | | | Ferrite | Pearlite | Bainite | |
| Comparative Example 3 | 657 | 0.80 | 11.0 | 35 (polygonal + acicular) | 53 | 12 | 10 |
| Comparative Example 4 | 682 | 0.840 | 13.1 | 32 (polygonal + acicular) | 68 | — | 14 |
| Comparative Example 5 | 864 | 0.884 | — | 27 (polygonal + acicular) | 35 | 38 | 17 |
| Comparative Example 6 | 606 | 0.819 | — | 40 (polygonal) | 69 | — | 12 |
| Comparative Example 7 | 668 | 0.769 | — | 36 (polygonal) | 64 | — | 10 |
| Comparative Example 8 | 845 | 0.809 | — | 30 (polygonal + acicular) | 35 | 35 | 15 |

Referring to the results in Table 3, it could be confirmed that, in the case of Example 1, it was possible to secure sufficient material properties for the reinforcing bar by increasing the content of silicon (Si), even though the vanadium (V) content was reduced compared to those of Comparative Examples 1 and 2. It is determined that the increase in the content of silicon (Si) in the Example prevented grain coarsening by interfering with grain boundary movement due to a change from the austenite (γ) to ferrite (α) phase transformation temperature and a change in the solubility of carbon in ferrite, and contributed to enhancing the material properties by forming VCN precipitates in ferrite through induction of the combination of residual vanadium (V), carbon and nitrogen (C, N) in the temperature range in which composite (polygonal and acicular) ferrite and bainite are formed. In addition, the Example did not follow conventional cooling in order to secure the required properties of the reinforcing bar, but controlled the surface layer portion by controlling the specific water amount and the line speed during tempcore, and induced the formation of a hardened core layer, composed of bainite and fine ferrite, in the central portion of the reinforcing bar.

Figure 3:
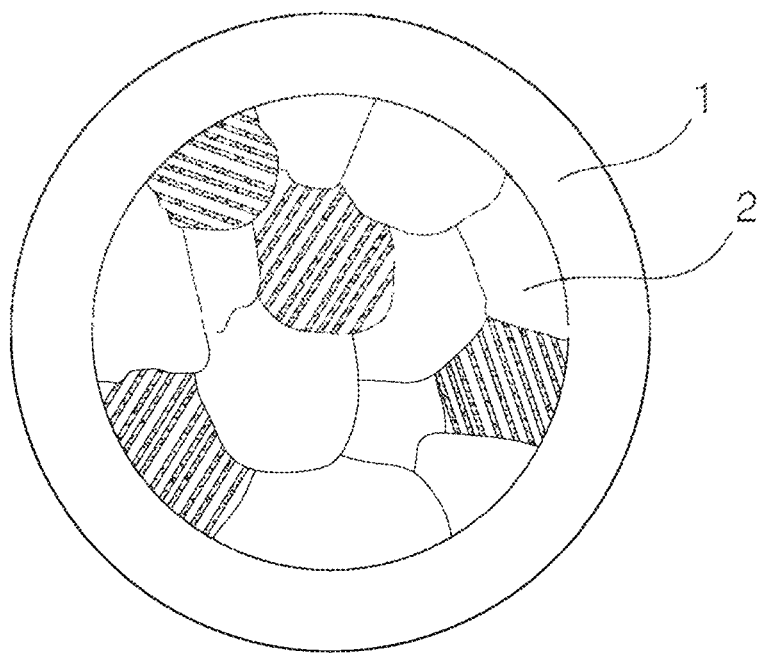
FIG. 3 is a cross-sectional view of a reinforcing bar of Comparative Example 1.

FIG. 2 is a cross-sectional view of the ultra-high-strength reinforcing bar manufactured according to the Example, and FIG. 3 is a cross-sectional view of the reinforcing bar of Comparative Example 1.

Referring to FIG. 2, it can be confirmed that the reinforcing bar of the Example of the present invention includes: a central portion 20 composed of a microstructure including an amount of 42 vol % of ferrite, an amount of 34 vol % of pearlite and an amount of 24 vol % of bainite; and a surface layer portion 10 formed on the outer circumference of the central portion 20 and composed of a microstructure including tempered martensite, and a core hardened layer 22 composed of a composite microstructure including lower bainite and fine ferrite is formed in the central portion 20.

Referring to FIG. 3, it can be seen that the reinforcing bar of Comparative Example 1 incudes: a central portion 2 including an amount of 35 vol % of polygonal ferrite and an amount of 65 vol % of pearlite; and a surface layer portion 1 formed on the outer circumference of the central portion 2 and composed of a microstructure including tempered martensite.

Figure 4A:
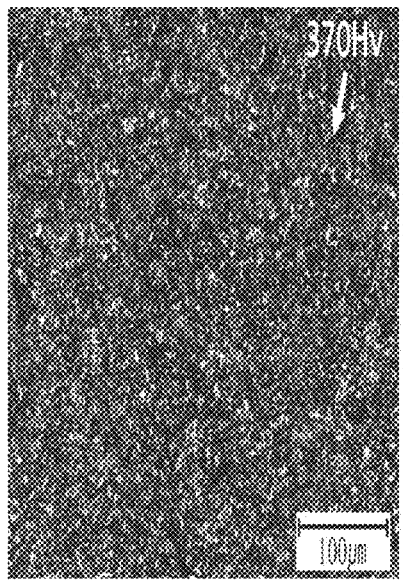
FIG. 4A is a photograph showing the microstructure of a surface layer portion of a reinforcing bar of an Example.
Figure 4B:
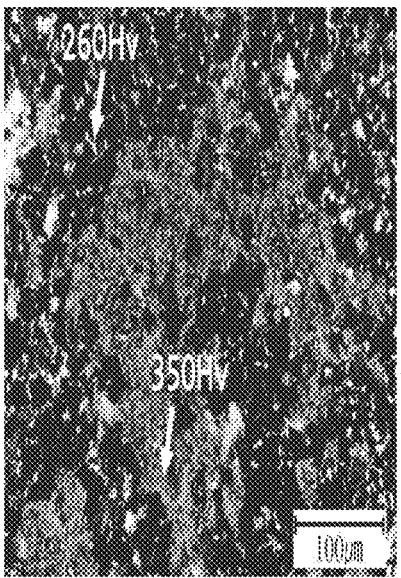
FIG. 4B is a photograph showing the microstructure of a central portion of the reinforcing bar of the Example.
Figure 4C:
FIG. 4C is a photograph showing the microstructure of a hardened core layer of the central portion of the reinforcing bar of the Example.
Figure 5A:
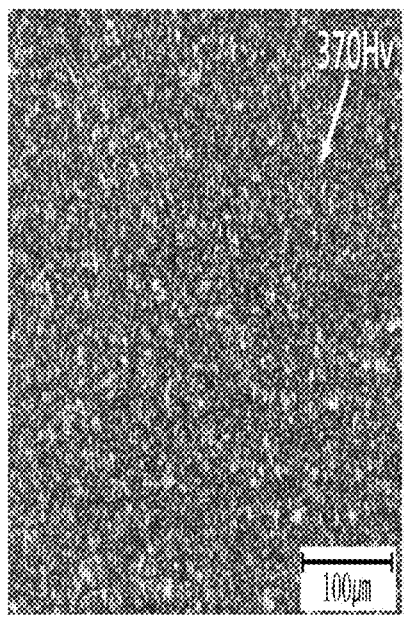
FIG. 5A is a photograph showing the microstructure of a surface layer portion of a reinforcing bar of Comparative Example 1.
Figure 5B:
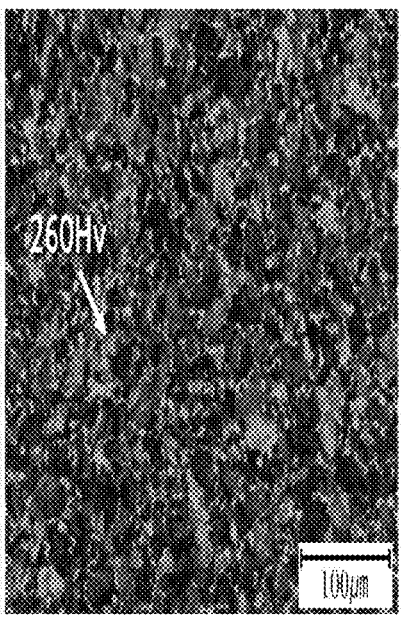
FIG. 5B is a photograph showing the microstructure of a central portion of the reinforcing bar of Comparative Example 1.
Figure 5C:
FIG. 5C is a photograph showing the microstructure of the central portion of the reinforcing bar of Comparative Example 1.

FIG. 4A is a photograph showing the microstructure of the surface layer portion of the reinforcing bar of the Example, FIG. 4B is a photograph showing the microstructure of the central portion of the reinforcing bar of the Example, and FIG. 4C is a photograph showing the microstructure of the hardened core layer of the central portion of the reinforcing bar of the Example. In addition, FIG. 5A is a photograph showing the microstructure of the surface layer portion of the reinforcing bar of Comparative Example 1, FIG. 5B is a photograph showing the microstructure of the central portion of the reinforcing bar of Comparative Example 1, and FIG. 5C is a photograph showing the microstructure of the central portion of the reinforcing bar of Comparative Example 1.

Referring to FIGS. 4 and 5, it could be seen that, in the reinforcing bar of the Example, a surface layer portion (hardness: 370 Hv) having a microstructure including martensite, and a central portion (hardness: 260 Hv) including ferrite, pearlite and bainite, were formed, and in the central portion, based on the cross-section of the reinforcing bar, about 15 to 25 area % of a hardened core layer (hardness: 350 Hv) was formed. In addition, it could be seen that the hardened core layer had a microstructure including lower bainite and fine ferrite having an average size of about 7 to 8 μm.

On the other hand, it could be seen that, in the reinforcing bar of Comparative Example 1, a surface layer portion (hardness: 370 Hv) having a microstructure including martensite and a central portion (hardness: 260 Hv) including polygonal ferrite were formed, and in the central portion, a hardened core layer like that in the Example was not formed.

Referring to FIGS. 4 and 5, it could be confirmed that the reinforcing bars of the Example and Comparative Example 1 had a clear difference in microstructure therebetween. In addition, as a result of measuring the microhardness, it could be confirmed that the hardness value of the central portion of the reinforcing bar of the Example was greater by about 100 Hv than that of Comparative Example 1.

It could be seen that the hardened core layer of the Example was formed through phase control based on stress-induced transformation (SIT) due to a link effect between strain energy accumulated during finish hot rolling and cooling control, and that it was possible to secure the hardened core layer under the specific water amount condition (3.7 to 3.9 l/rolled material-kg) of the present invention.

However, it can be seen that, if the amount of silicon (Si) added becomes excessively high, it has an effect of lowering elongation, although it is advantageous for securing strength, and hence it is important to add a proper amount of silicon (Si).

In addition, in order to simultaneously secure the seismic performance of ultra-high-strength steel having a yield strength (YS) of 700 MPa or greater, it is necessary to secure a certain carbon equivalent (Ceq) or greater. It can be seen that Comparative Example 3 having a carbon equivalent (Ceq) of 0.64 shows a possibility of securing seismic performance through the effect of adding silicon (Si), but the strength thereof is less than that of Example 1. In addition, it can be confirmed that the reinforcing bar of Comparative Example 4, which has a carbon equivalent (Ceq) of 0.67, also does not reach the yield strength and seismic performance targeted by the present invention. This suggests that it is necessary to secure both silicon addition and a carbon equivalent of 0.7 or greater in order to ensure seismic performance and strength.

Simple modifications or changes of the present invention can be easily implemented by those skilled in the art, and these modifications or changes can be considered included within the scope of the present invention.

The invention claimed is:

1. An ultra-high-strength reinforcing bar comprising: an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur(S), 0.005 to 0.02 wt % nitrogen (N), and the remainder being iron (Fe) and other inevitable impurities, and having a carbon equivalent (Ceq) of 0.7 or greater as calculated according to the following Equation 1,
the ultra-high-strength reinforcing bar comprising: a central portion and a surface layer portion formed on an outer circumference of the central portion,
wherein the reinforcing bar comprises, on a cross-section basis, 5 to 15 area % of the surface layer portion and 85 to 95 area % of the central portion,
wherein the surface layer portion comprises tempered martensite, and the central portion comprises ferrite, pearlite and bainite,
wherein the ferrite comprises any one or more of polygonal ferrite and acicular ferrite, and
the ultra-high-strength reinforcing bar has a yield strength (YS) of 700 MPa or greater, and a tensile strength/yield strength (TS/YS) ratio of 1.25 or greater:

$$Ceq=[C]+[Mn]/6+([Cr]+[V]+[Mo])/5+([Cu]+[Ni])/15 \quad [\text{Equation 1}]$$

wherein [C], [Mn], [Cr], [V], [Mo], [Cu] and [Ni] are contents (wt %) of carbon (C), manganese (Mn), chromium (Cr), vanadium (V), molybdenum (Mo), copper (Cu) and nickel (Ni), respectively, in the reinforcing bar.

2. The ultra-high-strength reinforcing bar of claim 1, having a yield strength (YS) of 700 to 850 MPa, a tensile strength/yield strength (TS/YS) ratio of 1.25 to 1.35, and an elongation (El) of 10% or greater.

3. The ultra-high-strength reinforcing bar of claim 1, wherein the central portion comprises an amount of 30 to 45 vol % of ferrite, an amount of 30 to 45 vol % of pearlite, and an amount of 15 to 25 vol % of bainite.

4. The ultra-high-strength reinforcing bar of claim 1, wherein the central portion comprises a hardened core layer having a hardness of 350 Hv or greater.

5. The ultra-high-strength reinforcing bar of claim 4, wherein the hardened core layer comprises lower bainite and fine ferrite having an average size of 5 to 10 μm.

6. The ultra-high-strength reinforcing bar of claim 4, wherein the hardened core layer has a hardness of 350 to 400 Hv, the central portion excluding the hardened core layer has a hardness of 240 to 280 Hv, and the surface layer portion has a hardness of 330 to 360 Hv.

7. The ultra-high-strength reinforcing bar of claim 4, comprising, on a cross-section basis, 15 to 30 area % of the hardened core layer.

8. A method for manufacturing an ultra-high-strength reinforcing bar, the method comprising steps of:
reheating a semi-finished product comprising an amount of 0.10 to 0.45 wt % carbon (C), an amount of 0.5 to 1.0 wt % silicon (Si), an amount of 0.40 to 1.80 wt % manganese (Mn), an amount of 0.10 to 1.0 wt % chromium (Cr), an amount greater than 0 and less than or equal to 0.2 wt % vanadium (V), an amount greater than 0 and less than or equal to 0.4 wt % copper (Cu), an amount greater than 0 and less than or equal to 0.5 wt % molybdenum (Mo), an amount of 0.015 to 0.070 wt % aluminum (Al), an amount greater than 0 and less than or equal to 0.25 wt % nickel (Ni), an amount greater than 0 and less than or equal to 0.1 wt % tin (Sn), an amount greater than 0 and less than or equal to 0.05 wt % phosphorus (P), an amount greater than 0 and less than or equal to 0.03 wt % sulfur(S), an amount of 0.005 to 0.02 wt % nitrogen (N), and the remainder being iron (Fe) and other inevitable impurities, the semi-finished product having a carbon equivalent (Ceq) of 0.7 or greater as calculated according to the following Equation 1;
manufacturing a rolled material by hot-rolling the reheated semi-finished product at a finish delivery temperature of 850 to 1,000° C.; and
cooling the rolled material to a Ms temperature or below, the cooling comprising a step of subjecting the rolled material to heat recuperation to reach a temperature of 500 to 700° C.,
wherein the ultra-high-strength reinforcing bar comprises: a central portion; and a surface layer portion formed on an outer circumference of the central portion,
wherein the reinforcing bar comprises, on a cross-section basis, 5 to 15 area % of the surface layer po tion and 85 to 95 area % of the central portion,
wherein the surface layer portion comprises tempered martensite, and the central portion comprises ferrite, pearlite and bainite,
wherein the ferrite includes any one or more of polygonal ferrite and acicular ferrite, and
the ultra-high-strength reinforcing bar has a yield strength (YS) of 700 MPa or greater, and a tensile strength/yield strength (TS/YS) ratio of 1.25 or greater:

$$Ceq=[C]+[Mn]/6+([Cr]+[V]+[Mo])/5+([Cu]+[Ni])/15 \quad [\text{Equation 1}]$$

wherein [C], [Mn], [Cr], [V], [Mo], [Cu] and [Ni] are contents (wt %) of carbon (C), manganese (Mn), chromium (Cr), vanadium (V), molybdenum (Mo), copper (Cu) and nickel (Ni), respectively, in the semi-finished product.

9. The method of claim 8, wherein the cooling is performed under conditions of a rolled material line speed of 6.7 to 7.2 m/s and a specific water amount of 3.7 to 3.9 l/kg.

10. The method of claim 8, wherein the reheating is performed at a temperature of 1,050 to 1,250° C.

11. The method of claim 8, wherein the central portion comprises a hardened core layer having a hardness of 350 Hv or greater.

* * * * *